April 19, 1960     G. R. ROESCH     2,932,981
FOOT OPERATED BRAKE LEVER
Filed July 10, 1957     2 Sheets-Sheet 1
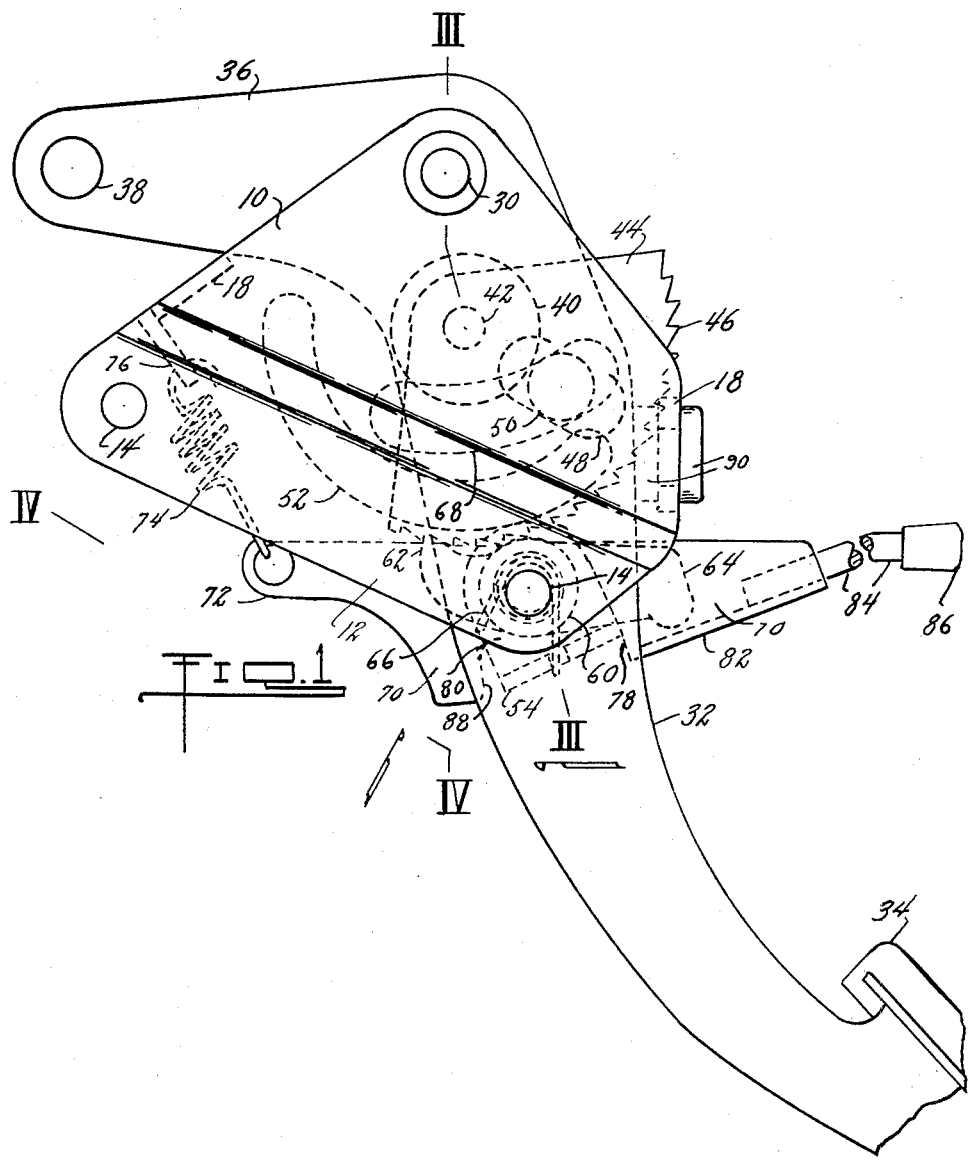
INVENTOR.
George R. Roesch
BY
Wm. O. Ballard
his atty

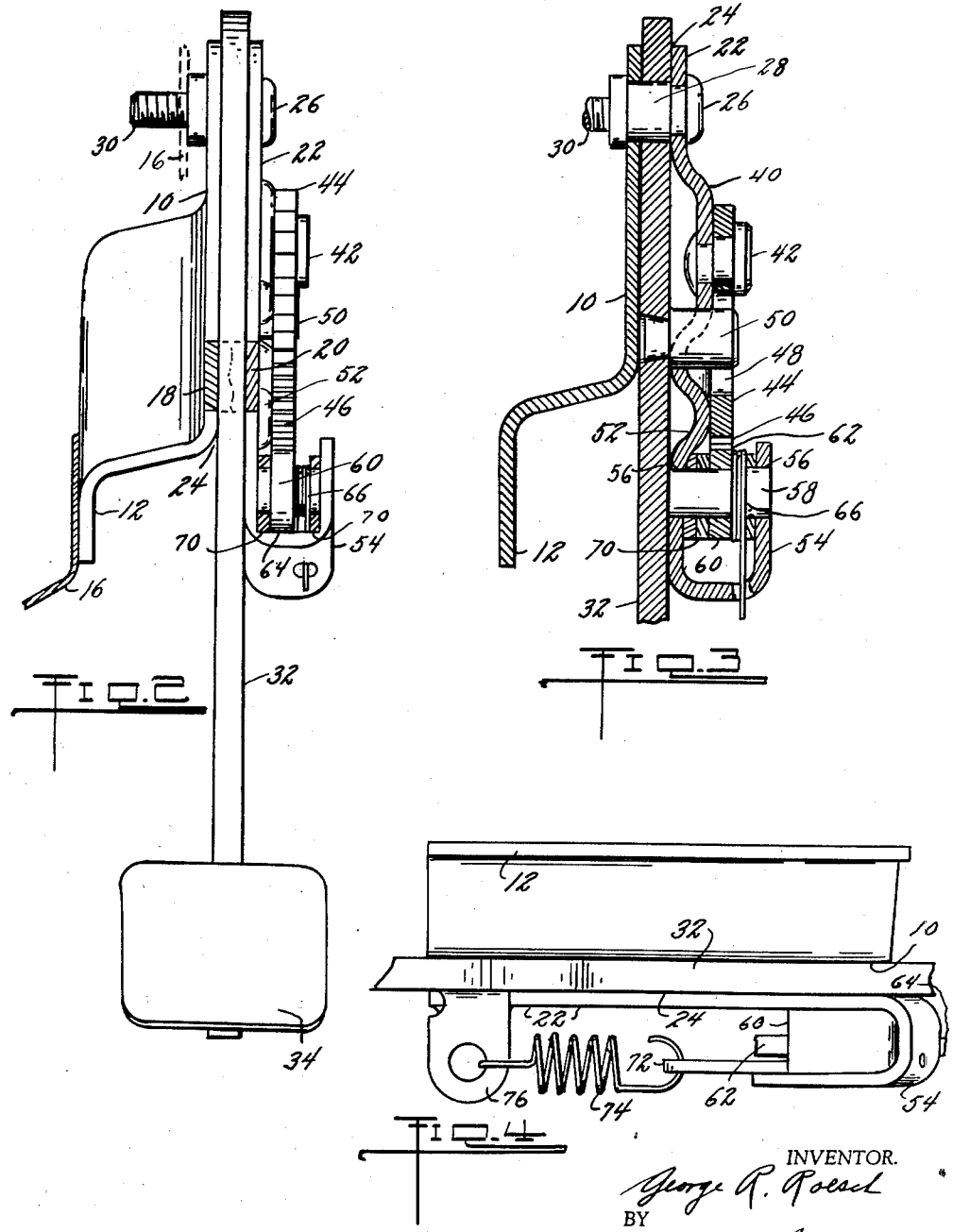

United States Patent Office 2,932,981
Patented Apr. 19, 1960

2,932,981

FOOT OPERATED BRAKE LEVER

George R. Roesch, Toledo, Ohio, assignor, by mesne assignments, to The Peters Stamping Company, Toledo, Ohio, a corporation of Ohio Application July 10, 1957, Serial No. 670,904

3 Claims. (Cl. 74—541)

This invention refers to foot operated brake levers.

An object of this invention is to provide an efficient foot operated brake lever, at a minimum cost, without sacrificing any of the features desired or required in mechanisms of this type.

Another object of this invention is to provide a foot operated brake lever which may be used for emergency or parking.

Another object of this invention is to provide an easily operated positive manual release.

And another object of this invention is to provide a foot operated brake lever which reduces operating noises, together with a release operable with a minimum of effort and sound.

Other objects and advantages of this invention relating to the arrangement, operation and functions of the related elements of the structure, to various details of construction, to combination of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side view of the brake lever assembly embodying the features of the invention herein;

Fig. 2 is a side view of the device of Fig. 1 looking from the right side thereof;

Fig. 3 is a view on the line III—III, Fig. 1; and

Fig. 4 is a view on the line IV—IV, Fig. 1.

The assembly herein is a completely prefabricated unit ready for installation within a motor vehicle at a preselected position so that the pedal and release levers are properly located for use by a driver of the vehicle.

The brake lever unit herein includes a main mounting plate 10 including an offset flange 12 equipped with eyes 14 for receiving suitable fastening elements, such as bolts, to rigidly attach such plate 10 to a preselected section 16 of a motor vehicle. The plate 10 when mounted is in a generally vertical position and is provided with offsets 18 to which may be welded offsets 20 from a second plate 22 thereby mounting said plate 22 in a substantially parallel spaced position as to the main plate 10 providing a clearway 24 therebetween.

Spanning the clearing 24 and mounted by the plates 10, 22, adjacent their upper termini is a bolt or rivet 26 which provides a pivot 28. This element may also be provided with a threaded extension 30 for engaging another portion of the section 16 to serve as a reinforcement for the brake unit mounting.

Swingably mounted on the pivot 28 is a foot operable brake lever 32 having a downward extension terminating in a pedal pad 34 facing the operator of the vehicle. The upper portion of the lever provides an arm 36 extending toward the front of the vehicle and is provided with an aperture 38 by which a connection of a brake setting cable may be attached to said lever. It is obvious foot pressure applied against the pad 34 will operate the brakes of the vehicle.

Mechanism is herein disclosed which will hold the brakes set or allow them to be released at will, such mechanism being preferably mounted by the plate 22 and on its side remote from the plate 10. This arrangement permits ready repair of any portion of the control mechanism if the occasion should arise, which occasion should be rare due to the extreme simplicity and inherent ruggedness of the unit.

The plate 22 below the pivot 28 is provided with an outwardly embossed area 40. Centrally attached to this area 40 is a pin or rivet 42 providing a pivot for a depending sector element 44 having its outer arc edge including a series of ratchet teeth 46. Radially extending within said sector between the pivot mount and teeth is a slot 48. This slot engages a pin 50 fixed to the lever 32. This arrangement causes the sector to be rocked when the lever 32 swings, but due to the fact the sector 44 has a materially shorter radial mount, that is on the pivot 42 as against the pivot mount 28 of the lever 32, the sector 44 is confined to a lesser swing extent than the lever. This means when the lever 32 is moved a certain distance, the sector 44 will be rocked only a fractional distance in proportion thereto.

The plate 22 is provided with an arcuate embossing 52 engaging the inner side of the sector 44 to provide a line track or slide therefor, and thus minimizing the frictional engagement with the plate 22, yet providing any side sway in the sector movement and reducing any looseness developing due to wear.

A section of the lower edge of the plate 22 is formed into a channel 54 whose opposing sides provide bearings 56 for a pin 58 which may be press fit thereinto serve as a pivot mount for pawl 60 below the sector 44. This pawl is provided with a detent 62 for engaging the ratchet teeth 46 and an oppositely extending finger 64. Spring 66 is also mounted on the pin 58 having one end engaging the detent 62 to urge said detent into ratchet engagement and the spring has its opposite end engaging the channel 54.

When the pedal 34 is depressed the ratchet is rotated as to the pawl in fractional increments as to the swing of the lever 32. The pawl will hold the lever in its swung position until released.

An arcuate slot 68 is provided in the plate 22 permitting the pin 50 to move therein.

Pivotably mounted on the pin 58 is arm 70 having one end forwardly extending to an apertured terminus 72. A spring 74 between the terminus 72 and a finger 76 inwardly turned from the plate 22 holds one edge 78 of a notch 80 centrally of the arm, against the channel 54. This swings the portion 82 of the arm 70 clear of and below the pawl finger 64.

An extension 84 for the arm 70 is provided terminating in an operating knob 86 which, when the unit is mounted, is located in a convenient position to be manually engaged by the operator of the vehicle.

In bringing the vehicle to a stop, pedal 34 is depressed, thereby causing the brakes to set and through the heretofore described pawl and ratchet mechanism, the brake will be held set and serve as a parking brake. When it is desiried to release the brakes, it is only necessary for the operator to lift the knob 86. This causes the arm 70 to be swiveled on the pin 58 against the resistance of spring 74. The extent of such movement is limited by the edge 88 of the notch 80 coming into contact with the channel 54.

However, this distance is sufficient to permit the arm portion 82 to engage the pawl finger 64 and swing such pawl to have the detent swing clear of the ratchet teeth 46. This permits brake cable pull against the arm 36 to swing the pedal back into normal position. This return swing may be cushioned by the lever 32 coming into contact with the cushion pad 90, which may be mounted on one of the plate connector sections 18, 20.

With the sector having its fractional swing, small increments of brake settings are permitted and the clicking noise usually found in devices of this character are practically eliminated. There is herein provided a compact, efficient unit embodying all the desired and necessary features in emergency and parking brakes and any requirement for servicing is practically eliminated.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for the purposes of description and not of limitation, and it is not intended to limit the scope of the following claims beyond the requirements of the prior art.

What is claimed and desiried to secure by United States Letters Patent:

1. In a foot operated brake mechanism, a main plate including means for rigidly attaching said plate to a preselected location in a motor vehicle, a second plate rigidly mounted in spaced parallel position as to said main plate, a first pivot mounted by and extending across the space between said plates, a lever mounted on said pivot between said plates having one arm depending therefrom to foot level within said vehicle to provide a pedal and another arm on the opposite side of said pivot extending to provide a brake cable connection, a second pivot mounted by said second plate spaced below the first pivot, a toothed sector element mounted on said second pivot having a radial slot therein, a pin fixed to said pedal lever extending into said slot, a third pivot mounted by said second plate below said second pivot, an arm rockable on said third pivot having a first arm outwardly extending therefrom and provided with a detent to serve as a pawl for cooperating with said toothed sector, and a second arm extending in the opposite direction from said pawl providing arm, and additional means rockable on said third pivot by manual manipulation to release said detent from the teeth of said toothed sector element.

2. The structure set forth in claim 1 wherein a spring is provided between said pawl and second plate normally urging said pawl into tooth engaging position.

3. The structure set forth in claim 1 wherein spring means are operable between said latter named additional means and said mounting plates to act against the normal release movement thereof.

References Cited in the file of this patent

UNITED STATES PATENTS

| | | |
|---|---|---|
| 2,132,954 | Jandus | Oct. 11, 1938 |
| 2,162,593 | Snell | June 13, 1939 |
| 2,189,268 | McCarthy | Feb. 6, 1940 |
| 2,296,675 | Jandus | Sept. 22, 1942 |
| 2,467,557 | Jandus | Apr. 19, 1949 |
| 2,694,945 | Jandus | Nov. 23, 1954 |
| 2,722,136 | Krause | Nov. 1, 1955 |
| 2,835,140 | Cox | May 20, 1958 |
| 2,851,900 | Powell | Sept. 16, 1958 |